United States Patent [19]

Matsuzaki et al.

[11] 4,118,844

[45] Oct. 10, 1978

[54] MACHINE TOOL

[75] Inventors: Hiroshi Matsuzaki, Kanazawa; Yoshihiro Tsukiji, Komatsu, both of Japan

[73] Assignee: Kabushiki Kaisha Komatsu Seisakusho, Tokyo, Japan

[21] Appl. No.: 829,193

[22] Filed: Aug. 30, 1977

[30] Foreign Application Priority Data

Aug. 30, 1976 [JP] Japan .............................. 51-102691
Aug. 30, 1976 [JP] Japan .............................. 51-102692
Aug. 30, 1976 [JP] Japan .............................. 51-102693

[51] Int. Cl.$^2$ ........................ B23Q 3/155; B23Q 3/157
[52] U.S. Cl. ................................. 29/27 C; 29/26 A; 29/568
[58] Field of Search ................. 29/568, 27 C, 27 A, 29/27 R, 26 R, 26 A, 39, 40; 408/35, 23

[56] References Cited

U.S. PATENT DOCUMENTS

| 2,393,696 | 1/1946 | Kraut et al. | 29/26 R |
| 3,703,027 | 11/1972 | Geyler | 29/39 |
| 4,006,518 | 2/1977 | Rudolph et al. | 29/27 R |

*Primary Examiner*—Gil Weidenfeld
*Attorney, Agent, or Firm*—Armstrong, Nikaido, Marmelstein & Kubovcik

[57] ABSTRACT

A machine tool comprises a table mounted on a bed and adapted to be moved in the direction of longitudinal axis of the bed, said table being arranged to be driven or rotated, intermittently indexed and controlled of the turning position thereof; vertical columns installed in a plane extending at right angles to the bed and having vertically sliding rails or vertical slides; a cross rail mounted on said vertical slides so as to be slidably moved in the vertical direction; a saddle mounted on said cross rail so as to be slidably moved in the horizontal direction; said saddle being arranged to slidably move the ram means in a direction at right angles to said cross rail; said ram means having a lower end face on which a turning tool can be fixedly mounted; said ram means having in the front face or the side of the lower end thereof a turret head adapted to be rotated and indexed in a plane extending at right angles to said table face, said turret head having a main spindle which is adapted to be rotated or driven and on which a rotary machining tool can be mounted so as to effect facing or milling, boring, drilling and tapping and reaming etc. of a work, said turning tool fixedly mounted on the lower end face of said ram means being adapted to effect turning or cutting of the work by rotating the table having the work on it.

10 Claims, 8 Drawing Figures

MACHINE TOOL

BACKGROUND OF THE INVENTION:

This invention relates to a machine tool, and more particularly to a complex machine tool having composite machining functions and arranged so as to enable a plurality of machining processes to be made on a workpiece once loaded or mounted thereon.

Heretofore, most of the combination of machining processes includes milling, boring and drilling etc. i.e. cutting work by rotation of tool, and there is few combining a turning process. Furthermore, the two machining systems have substantially lost their inherent applicabilities to general purposes for use because of troublesome tool replacing and positioning operations, and have been semi-exclusively used. Consequently, the rate of operation of them could not be improved on the production line for manufacturing a small amount of products of various kinds.

In view of the above-mentioned circumstances, numerical controls (NC) of machine tools have been rapidly developed since 1960, and automatic tool changers (ATC) have been used jointly with them, and therefore complex machine tools having high applicabilities to general uses have appeared in the market. In particular, the "Machining Center" has been employed widely as a representative one at the recent time.

However, these machining systems comprise milling machines or boring machines as base machines and have their principal functions to effect cutting of workpieces by rotating their tools, and therefore turning work has been required to be made by means of a separate or independent machine.

For this reason, if the turning work is made by means of these machines, it is required to effect profile cutting by means of a small-diameter end mill, as a result a number of problems are encountered such as a remarkable increase in the number of cutting processes, decreased economy of operation and also incapability of obtaining a predetermined initial surface roughness of a workpiece to be machined etc. On the other hand, the turning machine has been advanced in a single-function automation, however delayed in having complex function. The prior art for it includes U.S. Pat. Nos. 3,523,469, 3,703,027, 3,212,364 and 3,851,364; however, any of these is arranged to rotate the table at a fixed position, stated more specifically, they are only conventional turning machines each having a table rotating and indexing arrangement mounted thereon or having a ram means provided with a rotary tool mounting head. Therefore, in turning work, the workpiece can be turned or cut only by the face of the tool in parallel with the cross rail passing through the centre of the table so that the tools to be mounted on the tool arbor can be located only in the above-mentioned plane. Thus, the number of the tools to be mounted thereon is limited thereby increasing the number of times of replacement of tools.

Further regarding the milling, boring and drilling work etc. to be combined, because of the table of stationary type, when machining the face of a workpiece in parallel with the table or the upper surface of the workpiece placed on the table, the parts of the workpiece other than that placed on the circumference thereof require a programme to be made for determining a machining position by calculating coordinates based on the relationship between the table indexing angle and the position of the saddle, and the operation becomes complicated or troublesome. Furthermore, regarding machining of the face of the workpiece at right angles to the table face or the side of the workpiece mounted on the table, only centripetal machining of it can be effected, and therefore faces of the workpiece in parallel with the central axial plane thereof cannot be machined.

SUMMARY AND OBJECTS OF THE INVENTION

In view of the foregoing circumstances, the present invention provides a complex machine tool having a turning machine as a base machine therefor, and have the following objects.

(1) To enable complex machining of the workpiece including a turning process to be effected.

(2) To enable complex machining of the workpiece excluding turning process to be effected.

(3) To enable milling, boring and drilling etc. of the upper surface and four sides of the workpiece once loaded on the machine tool and also turning of the inner and outer surfaces thereof to be effected.

(4) To enable milling, boring and drilling etc. of the faces of the workpiece at right angles to the table face.

(5) To enable cutting of three-dimensional curved faces of the workpiece to be effected.

(6) To enable profile cutting of the workpiece to be effected.

(7) To enable formation of rectilineal or curved grooves on the inner and outer faces of the workpiece including slotting to be effected.

(8) To enable turning, milling boring, drilling, reaming, tapping and other special machining to be combined.

(9) To improve the operational efficiency of the machine tool on the production line for manufacturing a small amount and various kinds of products and also improve the efficiency of investment in facilities.

(10) To minimize the manpower required.

(11) To enable heavy cutting of the workpiece as compared with conventional machines of the kind specified.

(12) To enable tools to be mounted rigidly or fixedly on both turning tool post and the end of main spindle of the turret head.

(13) To enable the use of tools mounted in a plane extending radially relative to the centre of the table by positioning the ram means and the table relative to each other, and enable various kinds of cutting to be effected by means of a tool once replaced.

(14) To enable multi-shaft unit to be mounted by means of the turning tool post and the end of the main spindle of the turret head, thereby enabling multi-shaft simultaneous machining work to be effected, and

(15) To enable measuring instrument and tip removing means to be mounted on the end of the main spindle of the turret head, and enable them to be programmed in the composite processes.

The complex machine tool according to the present invention is capable of satisfying required functions of conventional turning machines in the turning process, and also can deal with or machine even a workpiece having curved or elliptical faces to be machined.

In conventional machine tools of the kind specified, tools can be located only in a plane in parallel with the cross rail and passing through the centre of the table; however, according to the present invention, tools can be placed in a plurality of planes extending radially and passing through the centre of the table and therefore various kinds of machining can be effected by means of the tool once mounted. In a complex process including milling, boring and drilling etc., the present invention enables calculation of coordinates on the plane in parallel with the table face to be made easily and compilation of programme to be simplified, and also enables drilling and milling of faces of the workpiece extending at right angles to the table face and in parallel with a plane passing through the centre of the workpiece to be effected easily.

Figure 1:
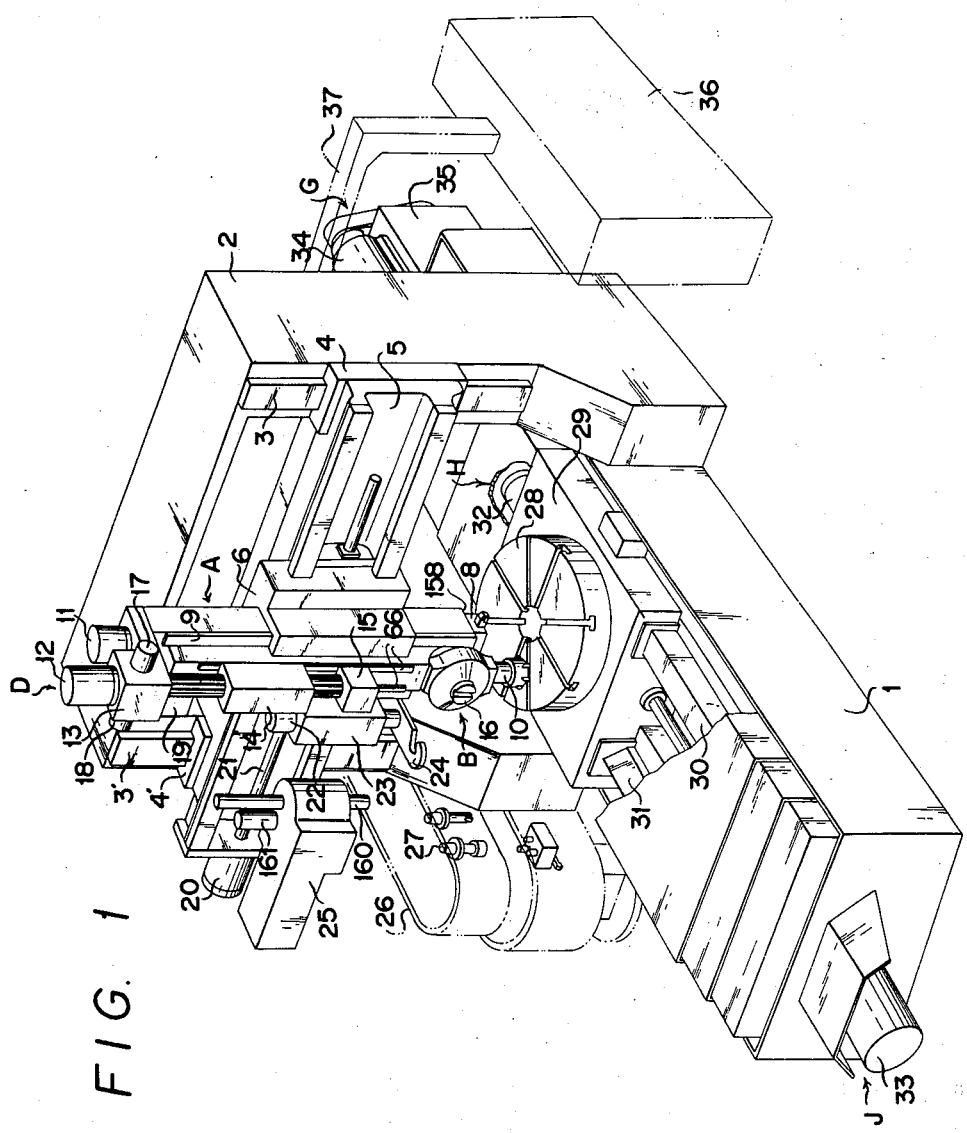
FIG. 1 is an overall perspective view of a machine tool according to the present invention.

DESCRIPTION OF THE PREFERRED EMBODIMENT:

The construction of the present invention will now be described in detail below with reference to the accompanying drawings. FIG. 1 illustrates an overall arrangement of one preferred embodiment of a complex machine tool. Reference numeral 2 denotes a column spanning a bed 1 and having vertical slides 3 and 3' mounted in the front thereof and which is adapted to guide the vertical sliding motion of a cross rail 5 coupled with slide units 4 and 4'. Reference numeral 6 indicates a saddle slidably mounted on the cross rail 5 and having in the front face thereof a guide means which enables a ram means "A" to be slidably moved in the direction at right angles to the cross rail 5, the ram means "A" having a slide way 9 engaged therewith.

The vertical sliding motion of the ram means "A" can be achieved by a conventional mechanism comprising a motor-driven screw feeding arrangement or a hydraulic cylinder, and the example shown employs a screw feeding arrangement comprising a servo motor 11.

The ram means "A" has in the lower end face thereof a tool post on which is mounted a cutting tool 8, and also has a turret head "B" capable of being freely rotated and indexed in the front or side of the lower end thereof, the turret head "B" having a main spindle on which a turning or cutting tool 10 can be mounted.

The ram means "A" accomodates inside the lower end thereof a clamping and unclamping arrangement "E" for the cutting tool 8 (refer to FIGS. 6, 7 and 8) and a turning and indexing as well as clamping and unclamping arrangement "C" for the turret head "B" (refer to FIGS. 3, 4 and 5), and further accommodates within the front or side thereof a pusher means "F" (constituting part of the tool clamping and unclamping arrangement) adapted to unclamp the cutting tool when the cutting tool 10 is downwardly indexed by the turret head "B".

Reference numeral 12 denotes a variable-speed motor adapted to rotate or drive the main spindle of the turret head "B" and which is an electric or hydraulic motor arranged to spline-connect an output shaft through a gear box 13 within drive unit 14 which has an output shaft to drive a clutch disposed within a clutch box 15.

At that time the drive unit 14 and the clutch box 15 are vertically moved as an integral unit by a feed mechanism on a guide rail 66 mounted on the ram means "A." When the drive unit 14 and the clutch box 15 have been lowered, a clutch 16 for the turret head "B" and a clutch 73 disposed within the clutch box 15 are engaged and then driven by rotation.

The clutches 16 and 73 are adapted to be engaged and disengaged only when the clutch groove is disposed vertically, and the engagement and disengagement of them can be achieved by effecting phase control by using the motor 17. Reference numeral 18 denotes a motor used for moving the cross rail 5 upwards and downwards through a gear box 19.

Reference numeral 20 denotes a servo motor serving to turn ball screw 21 to move the saddle 6 along the cross rail 5.

Reference numeral 23 represents a tool changer which comprises a rotary cylinder 22 and a change arm 24 and which cooperates with a tool assister 25 to exchange a tool 27 of tool magazine 26 with new one in the same manner as in the case of the tools 8 and 10. Further, comparatively heavy tools like turning tools may be directly picked up by moving the ram means to a tool selected by the tool magazine without using the above-mentioned tool changer. Mounted on the bed 1 are rails 30 and 31 on which a base 29 is slidably mounted. A table 28 is rotatably mounted on the base 29.

Attached to the bed 1 are a table turning arrangement "G" and a table moving arrangement "J." The base 29 is provided with a rotary indexing arrangement "H."

Reference numeral 32 denotes a servo motor for turning and indexing the table 28, 33 a motor for moving the table 34 a motor for turning and driving the table, and 35 a transmission mechanism.

Reference numeral 36 indicates a control means adapted to send out and receive control signals such as electrical and hydraulic pressure signals to and from the machine tool through a cable duct 37.

In the complex machine tool thus constructed, the movement of the tool in the direction of the longitudinal axis of the bed will be referred to as movement in the direction of Y axis, the servo motor 33 as motor for movement in the direction of Y axis, the horizontal movement on the cross rail 5 as movement in the direction of X axis, the servo motor 20 as motor for movement in the direction of X axis, the vertical movement of the ram means as movement in the direction of Z axis, and the servo motor 11 as motor for movement in the direction of Z axis.

Figure 2:
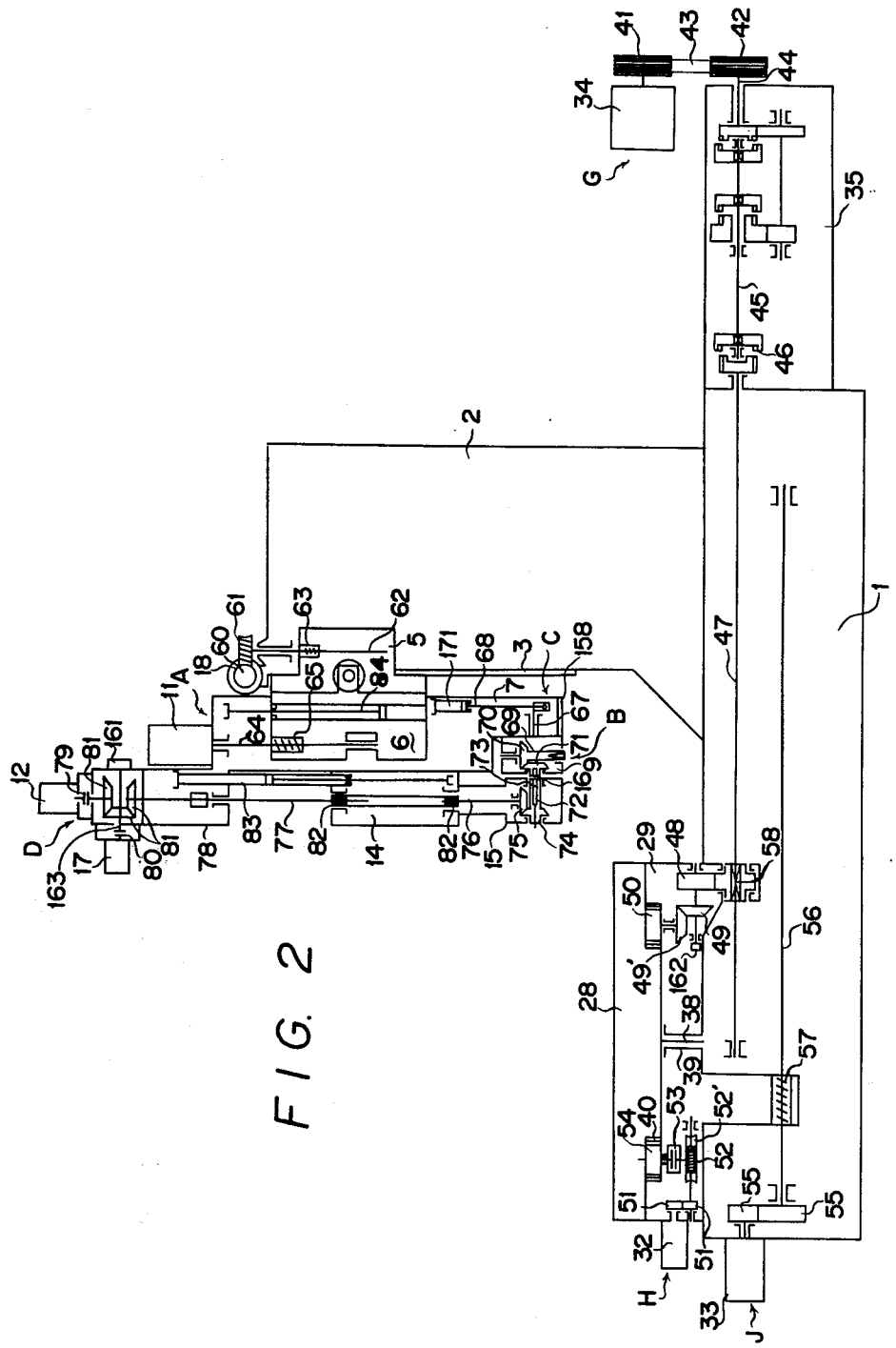
FIG. 2 is a skelton drawing showing a driving system for the machine tool according to the present invention.

FIG. 2 is a skelton diagram of a driving system for easier understanding of the machine tool according to the present invention.

A shaft 38 is rotatably supported through a bearing 39 so as to freely turn the table 28 on the base 29 mounted on the bed 1, and a ring gear 40 is fitted in the lower part of the table 28.

When the table driving motor 34 is actuated, its output is transmitted through a transmission means 43 to a driven pulley 42 thereby driving or rotating a shaft 44. Within a transmission mechanism 35 there is provided a speed change gear which can be selectively changed to change gear train so as to change the number of rotations of a shaft 45. The transmission of the output to a table driving shaft 47 is made on or off by rendering a transmission clutch 46 operative or inoperative. The power transmitted to the shaft 47 is transmitted through a gear train 48 and bevel gears 49 and 49' to a pinion 50.

The pinion 50 is engaged with the ring gear 40 fitted in the lower part of the table as an integral part thereof so that the table can be rotated about the shaft 38 at a selected speed. It is a well known technique that a D.C. variable speed motor is employed as the motor 34 and a power transmission gear having a simplified construction is employed.

The servo motor 32 is mounted on the base 29, and its power is transmitted through a gear train 51 or directly through reduction gear comprising worm gears 52 and 52' and through a clutch 53 to a pinion 54. The pinion 54 is engaged with the ring gear 40 fitted in the lower part of the table 28 as an integral unit thereof so that the table 28 can be rotated about the shaft 38. The clutch 53 is interlocked with a brake 162 so that when any one of the two is rendered operative the other is rendered inoperative. The same relationship is held between the brake 162 and the clutch 46. Therefore, when either one of the clutches 53 and 46 is actuated, the brake 162 is released. Further, the clutches 53 and 46 are interlocked to each other so that when any of the two is rendered operative the other is rendered inoperative. The motor 33 for movement in Y axis is adapted to rotate the ball screw 56 through a gear train 55 so that because of a nut 57 threadably engaged with the ball screw being fixedly secured to the base 29 the table 28 can be moved and positioned on the bed 1 in the direction of Y axis. At that time, because table driving shaft 47 has a spline formed over the entire length thereof, gear 48 can be engaged with the splined driving shaft 47, and therefore there is no interference with the movement of the base 29. Installed on the column 2 is a motor 18 the output shaft of which is fitted with a worm 60 to drive a worm wheel 61. The worm 60 and the worm wheel 61 are accommodated within the gear box 19. An output shaft 62 connected to the worm wheel 61 is threadably engaged with a nut 63 fixedly and integrally secured to the cross rail 5 so as to move the cross rail up and down along the vertical slide 3.

The saddle 6 is adapted to be moved horizontally on the cross rail 5, and can be moved and positioned by the motor 20 for movement in the direction of X axis as previously explained with reference to FIG. 1.

The motor 11 for movement in the direction of Z axis has an output shaft 64 in the form of ball screw which is threadably engaged with a nut 65 fixedly and integrally secured to the saddle 6 so that the ram means "A" can be moved and positioned relative to the saddle in the direction of Z axis.

The ram means "A" has in the lower end face a turning tool post 158 on which a turning tool can be mounted, and also has in the front thereof turret head "B" interlocked with an indexing arrangement "C" adapted to be turned and indexed about a shaft 67 and clamped and unclamped.

The turret head "B" has a main spindle 69 having a tapered portion formed in the leading end thereof on which a cutting tool can be mounted. The main spindle 69 is engaged with bevel gears 70 and 71, and the bevel gear 71 is connected to the clutch 16. Disposed in the front face of the ram means "A" is a turret head main spindle driving arrangement "D." The variable-speed motor 12 is mounted on a gear box 78 installed on the upper part of the ram means "A," and has an output shaft adapted to transmit the power through a clutch 79 and bevel gears 81 to a first output shaft 77. Since the first output shaft 77 is spline-connected to a second output shaft 76 by a spline coupling 82 of a drive unit 14, even when the drive unit 14 is moved downwards due to extension of the rod of a feed cylinder 83 along the slide way secured to the front face of the ram means "A" as a guide, there is no interruption of power transmission.

Installed under the drive unit 14 is a clutch box 15 adapted to rotate a clutch shaft 72 installed in the direction at right angles to the second output shaft 76 and a clutch 73 mounted on the leading end thereof through bevel gear trains 74 and 75.

The turret head main spindle driving arrangement "D" will receive a descending command signal sent by the control device and descend to the bottom dead centre set by the cylinder 83 where the clutches 16 and 73 are engaged with each other so that a command signal of completion of preparation for driving the motor 12 is sent to the control device. As a result, the motor 12 is rotated at a programmed speed so as to drive or rotate the main spindle 69 of the turret head "B." Further, the motor 17 is connected through a clutch 80 to a bevel gear group 81, and serves to adjust the phase of engagement of the clutches 16 and 73 in the regular order. When the motor 12 is driven, the clutch 79 is rendered operative, and the clutch 80 is rendered inoperative. Whilst, when the motor 17 is driven, the reverse operation is made, and therefore the gear train 81 cannot be driven simultaneously.

Further, the above-mentioned phase adjustment serves to regulate the phase of the turret head main spindle 69 to ensure the relationship with the A.T.C. (automatic tool changer).

Moreover, there is provided a balance cylinder 84 mounted between the ram means "A" and the saddle 6 for balancing the operation of the ram means.

Though the outline of construction of the present invention is described hereinabove, the construction of every main component part will now be described in detail below.

Turret Head "B"

Figure 3:
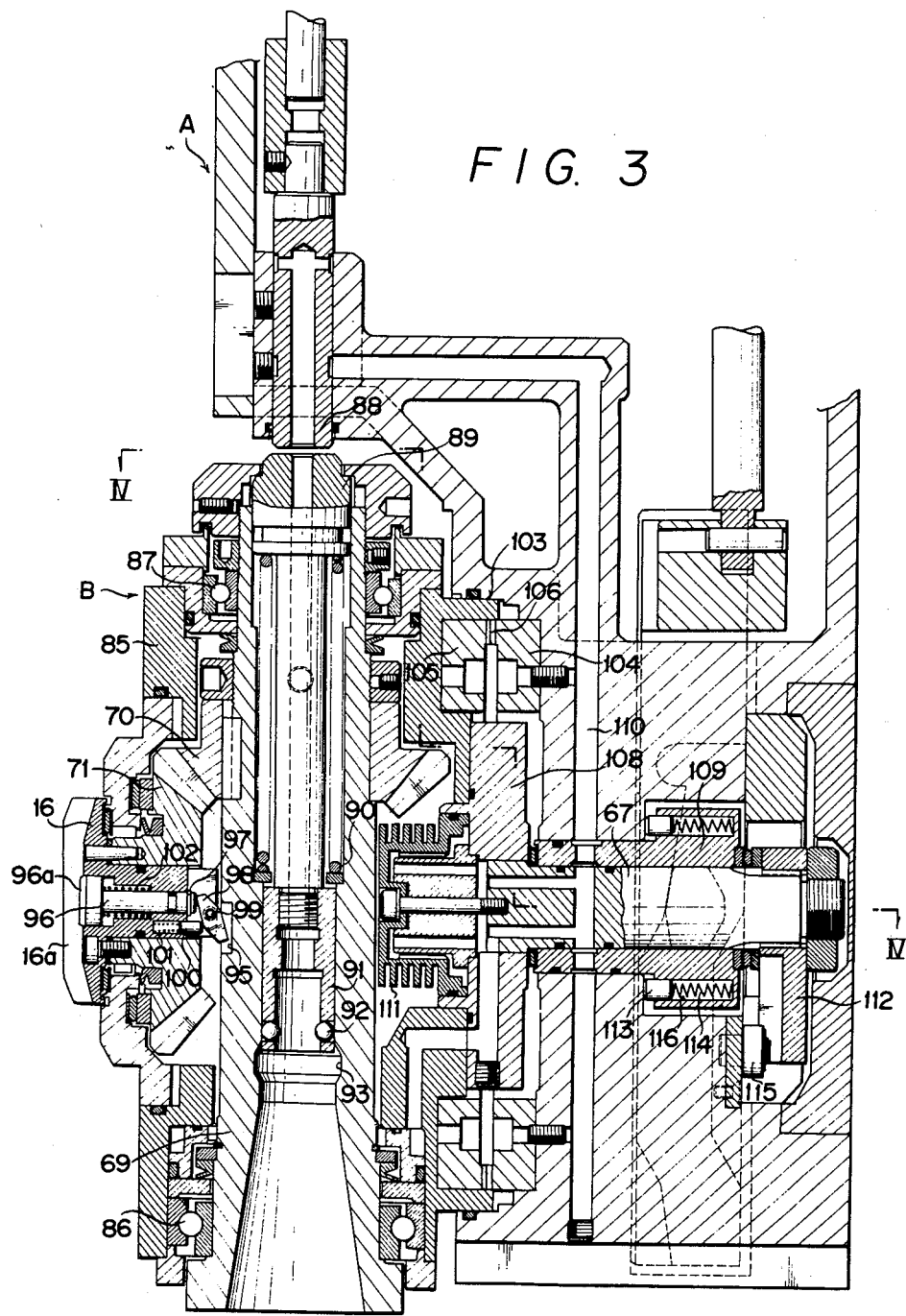
FIG. 3 is a longitudinal sectional view of a turret head.

FIG. 3 is a longitudinal sectional view of the turret head "B" mounted on the front face of the lower end of ram means "A." The turret head comprises a casing 85 in which the main spindle 69 is rotatably supported by bearings 86 and 87. The main spindle 69 has a tapered portion formed in one end thereof which can be registered with a tapered portion formed in an arbor of a turning cutting tool. The main spindle 69 is provided in the other end thereof with a tool mounting and dismounting draw bar means. When a rod 88 of a pushing means "F" accommodated in the ram means "A" is pushed down, the rod 88 abuts against the upper end of the draw bar 89, and is moved down against the biasing force of a spring 90 when it is given a further stroke. Thus, a sleeve 91 fitted to the leading end of the draw bar 89 is slidably moved down so that balls 92 can be seated in an inner bore groove 93 formed in the main spindle 69, and so the inner surface of the sleeve 91 becomes smooth or free from hindrance. Under such condition the stepped portion formed in the upper part of the arbor of the tool can be accommodated in the sleeve, and when pushing force is released, the draw bar 89 is pushed upwardly by the resiliency of the spring 90 thereby enabling the arbor of the tool to be held securely and registered with the tapered portion.

When the pushing means "F" is actuated again, the balls 92 will be put under the same condition as the tool's arbor is inserted so that the tool can be easily mounted and dismounted. Further, keyed to the outer face of the main spindle 69 is a bevel gear 70 which is engaged with a bevel gear 71 fitted in front of the casing 85. The clutch 16 is inserted in the inner bore of a gear 71 so as to hold the main spindle 69 and the pawl 16a in a parallel relationship thereby connecting the clutch 16 and the gear 71 as an integral unit.

The main spindle 69 has a groove 95 formed in a part of the outer face thereof.

A cam 98 having one end engaged with the leading end of a pin 96 inserted in the clutch 16 is held by a pin 99 so that it can be freely turned when pushed by the leading end of the clutch, and the other end of the cam abuts against the leading end of a push pin 100. The pin 96 is always biased outwardly by a spring 102, and its stroke end is limited by a snap ring 97.

Further, the push pin 100 is always biased inwardly by a spring 101 so that the lower end of the cam tends to be moved towards the main spindle.

However, when the main spindle is driven, the clutch 16 will push head 96a of the pin 96 against the biasing force of the spring 102 when it is engaged with the clutch 73 of the turret head driving arrangement "D" so that the cam 98 is disengaged from the groove 95 thereby enabling the main spindle to be rotated freely by the clutches 16 and 73.

Next, when it is desired to stop the main spindle, the motor 12 is stopped and the clutch 79 is rendered inoperative and the clutch 80 is rendered operative so as to rotate the motor 17 at a slow speed, and then the slow rotation is transmitted to the main spindle 69. At that time, the output to be transmitted from the motor 17 through the first output shaft 77, the second output shaft 76 and the gear trains 74 and 75 to the clutch 73 has the number of revolutions having a predetermined ratio to that of the motor 17 so that the turret head main spindle, the power of which is transmitted through the clutch 16, and the gear trains 70 and 71 will have the same ratio of revolutions.

In order to set the main spindle 69 at a predetermined position, a cam means and a limit switch (not shown) are provided within a phase reference signal generating means 161 mounted on one end of a shaft 163 connected through a clutch to the motor 17 so that when the phase cam turned the limit switch on braking force is applied to the motor 17 and at the same time the clutch 80 is rendered inoperative. Further, this limit switch serves to turn the power supply on simultaneously with the generation of start signal for the motor 17. After the stop of the motor 17, the limit switch is held for a short time and then released, and the arrangement is made such that even if the motor 12 is energized no signal is generated.

As for the phase reference signal generating means, non-contact system comprising a combination of reed switches and magnets should preferably be employed, because mechanical switching contacts such as limit switches will make switching by the rotation of the motor 12 and damage contacts by fatigue.

After the phase of the main spindle 69 and the clutch are adjusted in such a manner, the clutches 16 and 73 are disengaged. Since when the clutches 16 and 73 are disengaged, the pin 96 is pushed outwardly by the force of the spring 102, the cam 98 is urged against the outer face of the main spindle 69 by the push pin 100 and the spring 101. When the cam 95 is seated in the groove 95, the main spindle 69 and the clutch 16 will stop at a predetermined phase so that the mounting and dismounting of the tool by the A.T.C. and the phase of engagement of clutches can be made correctly. The casing 85 is slidably and rotatably guided by a socket 103 formed in the front part of the ram means "A," and a half coupling 104 fixedly secured to the ram means "A" is engaged with a half coupling 105 fixedly secured to the casing 85 by an engaging member 106. Further, because the casing 85 is fixedly secured to a flange 108 fixedly secured to the shaft 67, the casing can be rotated within a bearing 109 mounted in the ram means "A."

Reference numeral 110 denotes a cooling liquid passage, and finned cap 111 serves to transmit the heat generated when the main spindle 69 within the casing 85 is driven or rotated to the cooling liquid thereby controlling the temperature rise in the turret head "B."

Turret Head Indexing Arrangement "C"

Figure 4:
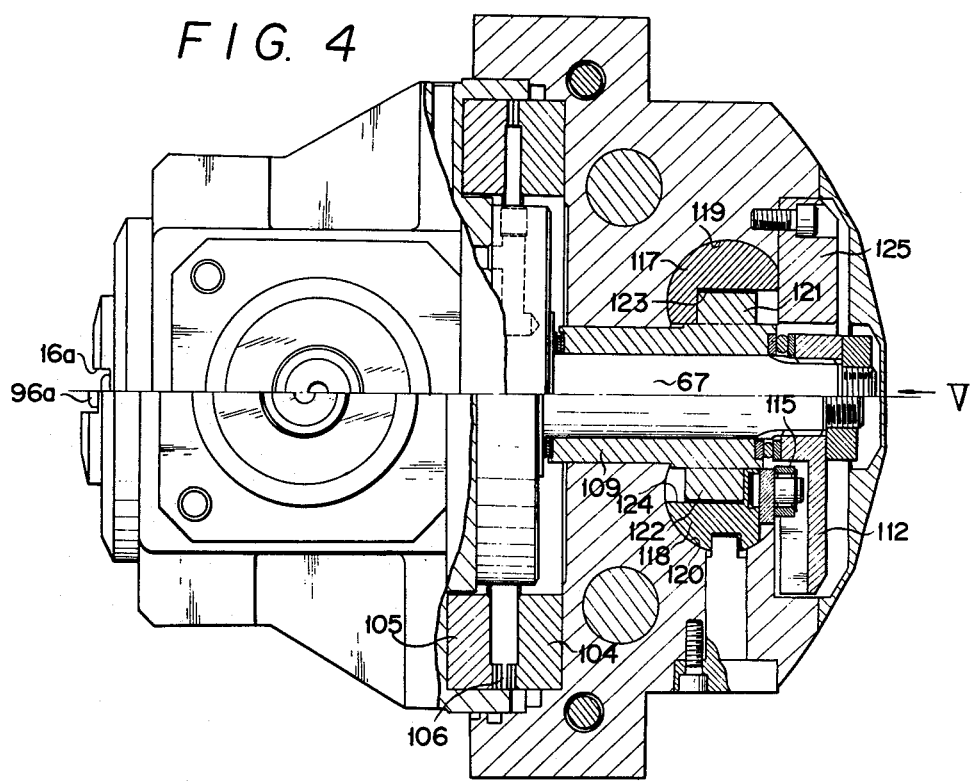
FIG. 4 is a sectional view taken along the line IV—IV in FIG. 3, the upper half thereof showing a condition wherein the clutch is made operative, whilst the lower half showing a condition wherein the clutch is inoperative.

The bearing 109 has a plurality of cavities 116 formed in the periphery thereof for accommodating springs 114 and pins 113, the end faces of the pins abutting against the inner face of the ram means "A" thereby preventing possible chattering of the turret head "B" during the indexing operation. Indexing turning lever 112 is engaged with a roller 115 attached to an indexing clamp rod 117. Further, as shown in FIG. 4, indexing clamp rods 117 and 118 are arranged to slidably move within guide holes 119 and 120, respectively. In this case, because projections 121 and 122 formed on either side of the bearing 109 are engaged with cam grooves 123 and 124, respectively, the bearing 109 will move in the direction of the axis of the shaft 67 against the biasing force of the spring 114. Therefore, the engaging member 106 of the clutches 104 and 105 is disengaged so as to permit rotation of the turret head "B." Further continuous movement of the rods 117 and 118 allows movement of the roller 115 engaging with the indexing turning lever 112, and the shaft 67 is indexed by an angle set within a predetermined stroke of the rods so that the turret head "B" can be indexed in the same manner. Further, because the cam grooves 123 and 124 of the rods 117 and 118 are set so as to move the bearing 109 backwards at the upper and lower ends of the entire stroke and move it forwards at the intermediate part thereof, the clutch members 104 and 105 will clamp the ram means "A" and the turret head "B" at the upper and lower ends of the stroke and unclamp them at the intermediate part thereof.

Figure 5:
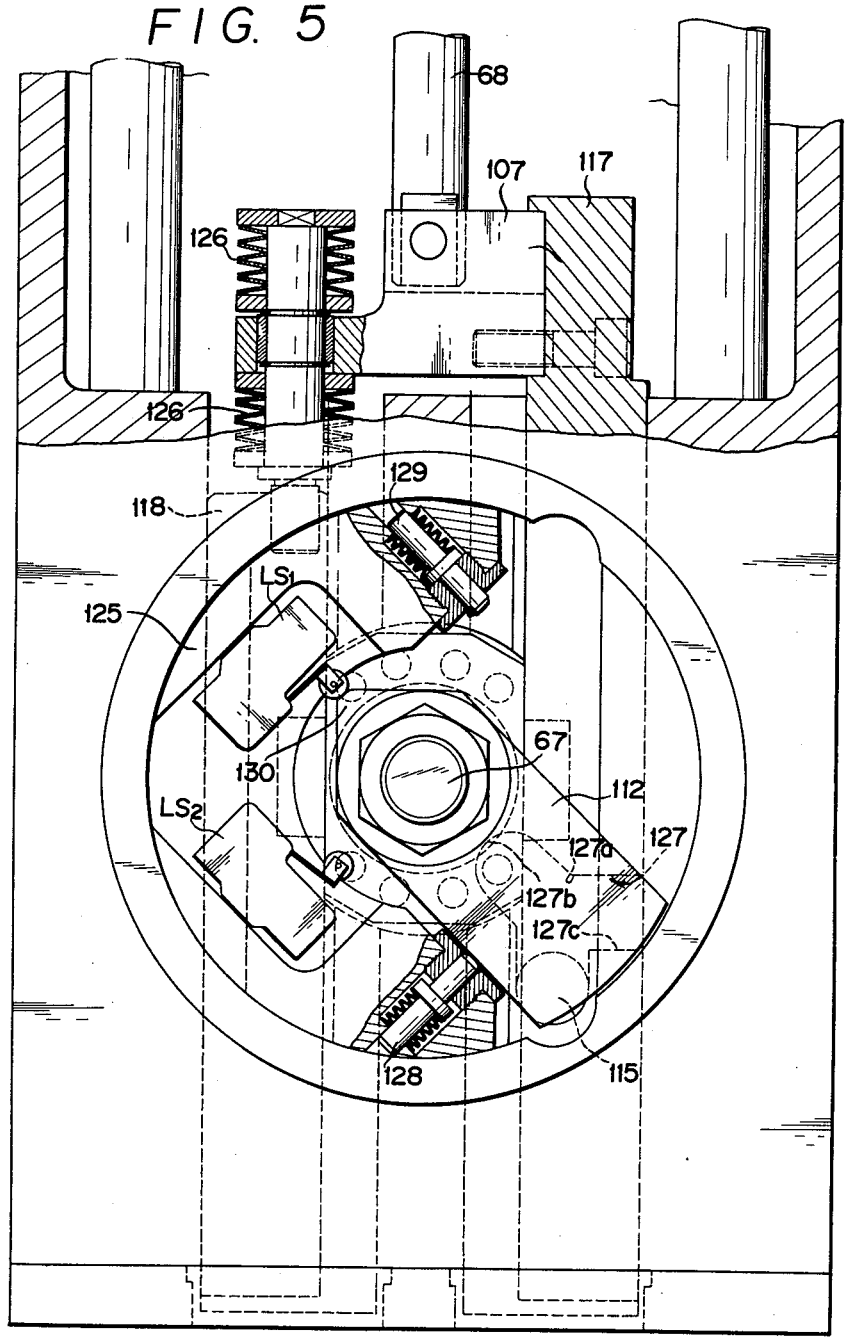
FIG. 5 is a partly broken view taken in the direction shown by "V" in FIG. 4 showing a condition when the cap at the right hand end is removed.

FIG. 5 shows the turret head "B" indexing clamp arrangement in which the main spindle 69 of the turret head "B" is located vertically, and the indexing lever 112 is directed downwards. When it is desired to index the above-mentioned main spindle 69 by a phase of 90°, the indexing clamp cylinder 171 is actuated to move the piston rod 68 upwards so that the rod 117 fixedly secured to the bracket 107 and the rod 118 suspended from a plate spring group 126 with a degree of freedom of movement can be moved upwards within the guide holes 119 and 120. Regarding clamping and unclamping of the turret head "B," the roller 115 engaged with the lever 112 will engage with Y-shaped groove 127 formed or engraved in the lever and move upwardly along the groove to reach a point 127a. Within a region where unrestrained engagement of the roller 115 and the Y-shaped groove 127 is permissible or from the condition shown in the drawing to the point 127a, the lever 112 will not turn and during this stroke the shaft 67 is moved forwards thereby unclamping the turret head "B" by the clutches 104 and 105. When the roller 115 has abutted against the point 127a, the shaft 67 is turned, and when the roller 115 has reached a point 127b the lever 112 is directed horizontally. Thereafter, the roller 115 will return from the point 127b to the point 127a, then the lever 112 will abut against a stopper 129. The stroke of movement from the point 127a through the point 127b to the point 127a is referred to as an indexing stroke. After that the roller 115 will reach a region 127c; however, because the region 127c extends vertically, the lever 112 will not turn. Stated in brief, the stroke of movement within the region 127c is the clamping stroke of the clutches 104 and 105 after completion of the indexing.

Reference numeral 125 denotes a bracket provided with stopper means 128 and 129 having shock absorbing function. When the lever 112 abuts against either of the stopper means, it will have a correct indexing angle and a projection 130 formed in the rear part of the lever 112 will actuate any of limit switches LS1 and LS2 so as to send out a command signal of completion of indexing to the control device.

Turret Head Driving Unit "D"

Figure 6:
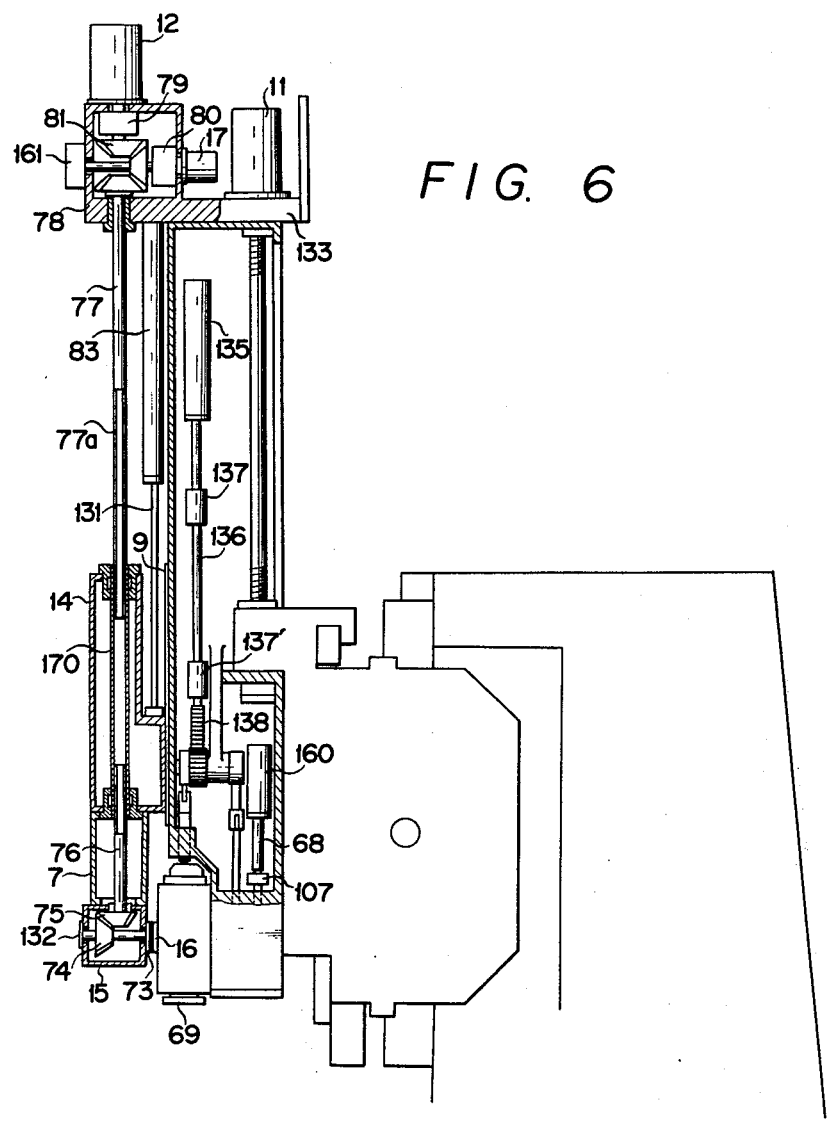
FIG. 6 is a skelton drawing for explaining the operation of a turret head drive means and a tool clamping and unclamping means.

Referring to FIG. 6, bracket 133 mounted on the upper face of the ram means has a gear box 78 formed therein, and the variable-speed motor 12 mounted on the gear box is arranged to rotate bevel gears 81 through a clutch 79 thereby driving the first output shaft 77. The first output shaft 77 has its splined portion 77a formed in the lower part thereof which is engaged with a coupling shaft 170 rotatably mounted within the drive unit 14 and having a splined portion formed in the inner face thereof. Therefore, a second power take-out shaft 76 having a splined part engaged with the lower part of the coupling shaft 170 is rotated so as to rotate bevel gears 75 and 74 installed within the clutch box 15, drive a shaft 132 and drive a clutch 73 attached to the shaft and clutch 16 fitted on the side of the turret head thereby driving or rotating the main spindle 69 of the turret head.

Control or extension and contraction of the rod 131 of the cylinder 83 secured between the above-mentioned bracket 133 and the drive unit 14 enables the turret head driving unit to slidably move up and down between the groove formed in the rear face of the drive unit 14 and the guide way 9 provided in the front face of the ram means "A."

Therefore, during turning or cutting work, because of the clutch box 15 being located at a high position in front of the ram means, there is no interference with a workpiece being machined, so that the minimum diameter of workpiece to be machined can be reduced considerably.

Tool Clamping and Unclamping Arrangement "EF"

Figure 7:
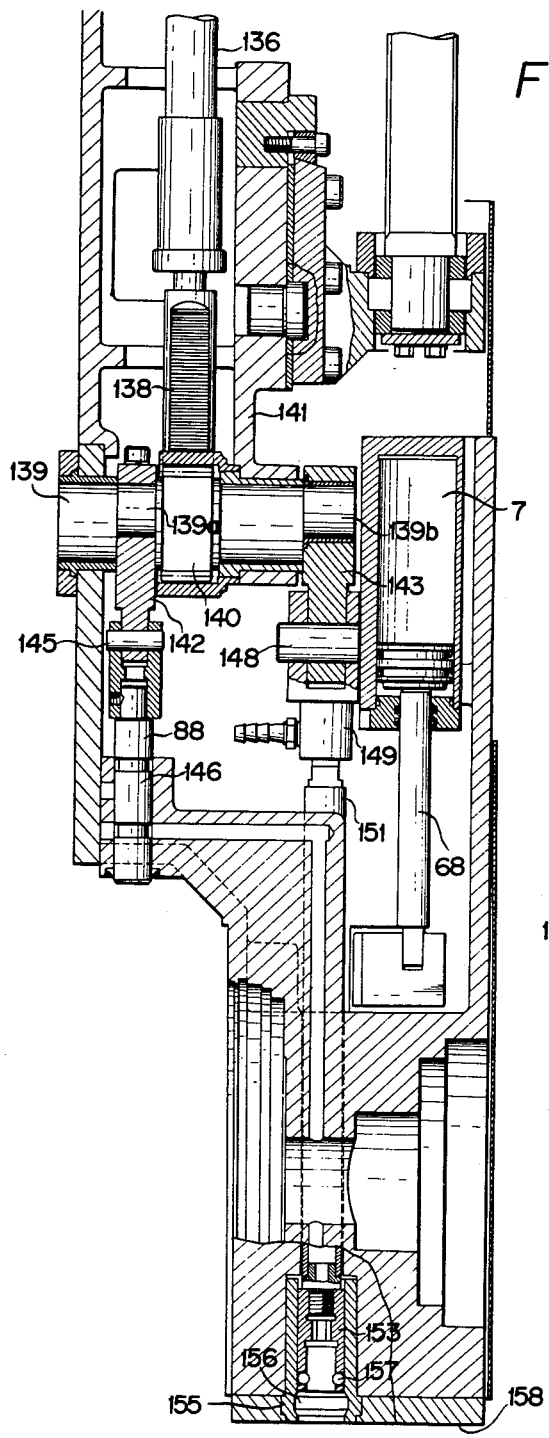
FIG. 7 is a longitudinal sectional view showing the details of the tool clamping and unclamping means.

As can be seen from FIG. 6, a hydraulic cylinder 135 is mounted inside the ram means, and its rod 136 is held by bearings 137 and 137', the rod having at its end a rack 138 which engages, as shown in FIG. 7, with a gear or teeth 140 formed or engraved in a crank shaft 139 thereby rotating the shaft. The crank shaft 139 is supported between the front wall of the ram means and an inner rib 141 and is concentric with the above-mentioned gear 140. The axis of cranks 139a and 139b is offset from that of the shaft 139 by a predetermined amount thereby allowing levers 142 and 143 to effect crank motion when they are rotated. Connected with the lever 142 through a free fulcrum 145 is a push rod 88 adapted to reciprocate through a guide hole 146 formed in the ram means. Such reciprocatory movements of the push rod 88 will push down or return the draw bar 89 fitted to the upper end of the turret head main spindle 69 from the predetermined position thereof thereby clamping or unclamping the leading end of the arbor for the turning cutting tool. This is referred to as a pushing arrangement.

Figure 8:
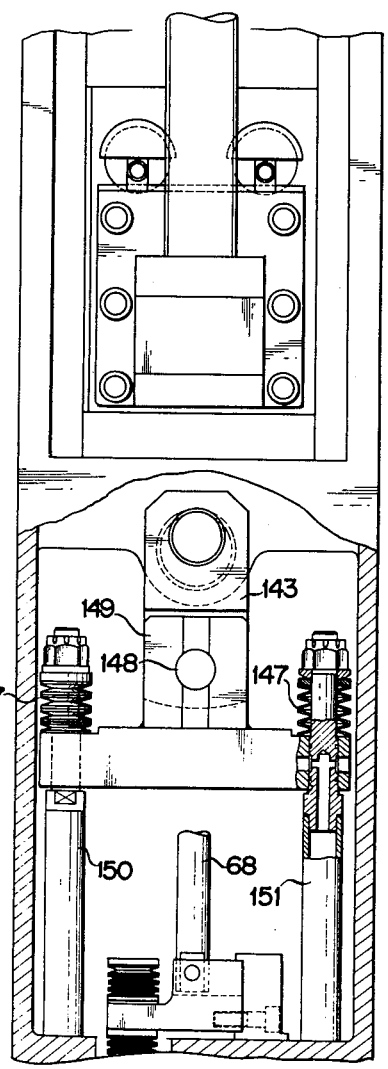
FIG. 8 is a partly broken rear view of the tool clamping and unclamping means.

Further, the lever 143 is coupled with the bracket 149 by means of the free fulcrum 148, and as shown in FIG. 8, the bracket 149 having on both sides draw bars 150 and 151 suspended from plate springs 147 and 147, respectively. This is for the purpose of not forcing movements of sleeves 152 and 153 which will be mentioned later and allowing them to have a degree of freedom.

The draw bars 150 and 151 have sleeves 152 and 153 threadably engaged with their leading ends, the sleeves being adapted to slidably move within cylindrical members 154 and 155, respectively. The above-mentioned cylindrical members 154 and 155 each has a large diameter groove 156 formed inside thereof, and when the draw bars are moved downwards by the crank motion, the sleeves 152 and 153 will move down together so that balls 157 accommodated within a plurality of holes formed in the leading ends of the sleeves can be seated in the groove 156 and there is no hindrance in the bores of sleeves 152 and 153 thereby not preventing the insertion of pullstuds.

At that time, for mounting the turning or cutting tool 8 on the lower end face of the ram means, when a plurality of pull-studs are inserted into the sleeves and the cylinder 135 is actuated so as to move the draw bars 150 and 151 upwards, the balls 157 will enter constricted portions of the pullstuds and move upwards to the position shown in FIG. 7 so as to clamp the tool 8. For this reason, the turning or cutting tool 8 can be held securely between the pullstuds and the lower end face of the ram means and therefore can resist heavy cutting work. This is so-called clamping and unclamping arrangement of the turning or cutting tool 8.

Because the offset phase of the crank shaft 139 is the same, the turning or cutting tool can be held securely by means of both the main spindle of the turret head and the pullstuds mentioned here depending on the requirements of the tool to be mounted. In this case, the tool 10 to be usually mounted on the turret head cannot of course be employed.

When it is desired to effect heavier cutting work, it is desirable to mount the tool 8 by means of both the aforementioned tool post for turning tool and the main spindle of the turret head.

Operation

The operation of the complex machine tool according to the present invention i.e. machining of workpieces by a complex process including turning, milling, boring and drilling will now be described in detail hereinbelow.

When it has been checked that the shafts of the machine tool occupy their starting positions simultaneously with switching on the power source for the NC control device and the machine tool, the machine tool is ready for start. At that time, when the start button is depressed, the machine tool is automatically controlled by a previously programmed signal.

When it is desired to effect turning as the first process, the machine tool is actuated to move a designated tool out of a plurality of tool accommodated in a tool magazine directly below the tool assister shaft 160, and at the same time the ram means is moved at a tool replacing position. Then, the tool assister shaft 160 will move downwards and then move upwards with a designated tool held thereby. When the tool assister shaft 160 reaches its upper end of stroke, the arm 24 of the tool changer 23 mounted on the side of the ram means is rotated so as to receive a tool held by the tool assister shaft 160. The arm 24 which has received the tool will descend and withdraw the holding part completely from within the shaft. When the arm has been rotated by an angle of 180° from the tool assiter, the above-mentioned designated tool is moved just below the lower end face 158 of the ram on which a turning tool is mounted. After that, when the arm 24 is moved upwards, the pullstud attached to the tool is inserted into the sleeve 153. At that time, because the draw bar 151 occupies its lower position, the balls 157 will not become an obstacle. Thereafter, the draw bar 151 is moved upwards, and the tool is mounted rigidly by the lower end face 158 of the ram means and the pullstuds so as to resist sufficiently the cutting resistance. Alternatively, as aforementioned, the ram means per se will move to the position of the tool magazine thereby enabling replacement of the tool to be effected without using ATC. The arm 24 is rotated by an angle of 90° and wait at its upper end position until the next replacement of the tool. When the arm 24 has returned to its original position, the programme will proceed further and the tool point of the ram means is moved directly above the machining position of the workpiece. At that time, the table is moved from the loading position towards the cross rail and is positioned so that the tool point on the X—X axis passes through the table centre. When the tool point has been positioned at a previously programmed cutting position, the table is given a predetermined number of revolutions and a start signal is sent to the Z—Z axis. As a result, the ram means is moved downwards and its speed is controlled by an input signal for cutting feed so as to repeat the required number of turning of the outer and inner faces of a workpiece and then return to its original position (Top dead centre of the ram).

The characteristic feature of the machine tool of the present invention resides in that the table can be moved in the direction of Y axis while it is rotated. Therefore, unlike the conventional machine tool wherein the tool point can be located only on a plane on the X—X axis passing through the table centre, the tool point can be located also on a plane on the Y—Y axis and composite planes on the X and Y axes and therefore various kinds of turning work can be effected. Further, the time required for replacement of tool which occupies a considerably large part of the maching cycle time can be reduced so much.

In the turning process too, the machine tool enables the replacement of a various kinds of tools to be effected, and also permits a single or a plurality of shafts to make sequential motion. The tools which have completed their machining work will be returned to the original positions of the magazine, and then the shafts will be returned to their original positions.

Next, when milling work is effected, the manner of replacing the tool is the same as in the above-mentioned case; however, because the assister 160 prepares for the tool for the next process, the tool replacement will be effected one step earlier.

Further, the tool is mounted on the end of the main spindle 69 of the turret head and can be fixedly secured by means of the balls 92 within the sleeve 91, the tapered portion and the key way of the main spindle's flange. When the tool has been mounted on the end of the main spindle 69, the turret head driving unit 14 is moved downwards. As a result, the clutches 16 and 73 are engaged with each other so as to rotate the motor 12 thereby rotating the main spindle at the number of revolutions to meet a predetermined cutting condition.

When cutting the face of a workpiece in parallel with the face of the table, the turret head "B" will place the main spindle 69 vertically or in parallel with the ram means, whilst when cutting the face of a workpiece extending at right angles to the face of the table, the main spindle 69 is indexed, turned by an angle of 90° and positioned in parallel with the table 28 by the turret head indexing arrangement "C." The amount of cutting is given by either the X axis or the Z axis, but the amount of cutting feed is given by the movement of the table or by either the Y axis or Z axis.

Then, the table can be indexed at a desired angle and so the outer peripheral surface of the multifaced faces can be machined.

Next, when effecting boring and drilling etc., a tool is mounted on the main spindle of the turret head and the main spindle is rotated in the same manner as in the case of milling work. The only difference resides in that in case of boring and milling the cutting feed is made by either the X axis or the Z axis, whilst positioning of the machining is made mainly by the X—Y axis and the table indexing.

When machining faces of a workpiece extending at right angles to the table face by the conventional stationary table type machine tool, only indexing of the table can be effected so that machining is limited only to perforation towards the centre and boring work, Therefore, face machining or milling work cannot be effected.

Thus, upon completion of turning, milling, boring, perforation, tapping and reaming of a workpiece once loaded or machining of the upper face, the outer and inner peripheral surfaces of the workpiece, the X, Y and Z axis and the table indexing are returned to their original points and the tool is accommodated in the tool magazine by the action of the A.T.C. so that the machine tool can be stopped by a command signal of completion of machining and waits for the next start signal.

It is to be understood that the foregoing description is merely illustrative of the preferred embodiment of the invention and that the scope of the invention is not to be limited thereto, but is to be determined by the scope of the appended claims.

What we claim is:

1. A complex machine tool comprising a bed; a table mounted on the bed so as to be slidably moved in the direction of longitudinal axis thereof; rotating means mounted on said bed to rotate said table; transfer means mounted on said bed so as to transfer said table in the direction of longitudinal axis of the bed; rotary indexing means adapted to index said table; a pair of columns installed vertically on either side of said bed; a cross rail transversely supported on said columns; ram means attached to said cross rail and adapted to be moved at right angles to the face of said table; a tool post mounted on to the lower end face of said ram means and having a turning tool fixedly secured thereto; a turret head mounted on one face of said ram means, said turret having a rotating main spindle for mounting a rotary machining tool; and a turret head rotating means adapted to rotate said turret head.

2. A complex machine tool as defined in claim 1, further comprising a turret head turning and indexing means provided within the ram means.

3. A complex machine tool as defined in claim 1, further comprising means provided within the ram means for clamping and unclamping the tool mounted on the turret head and the tool mounted on the tool post, respectively.

4. A complex machine tool as defined in claim 1, wherein said turret head rotating means comprises a first motor mounted on the upper part of said ram means, a gear train connected to said motor, a drive unit connected to said gear train and adapted to be moved up and down along a slide face mounted on the front face of said ram means serving as a guide, and a clutch connected to the lower part of said drive unit to transmit the output of said motor to the turret head.

5. A complex machine tool as defined in claim 4, further comprising a second motor mounted on the upper part of said ram means and adapted to adjust the phase of said turret head main spindle and that of said clutch and move the latter to a position to permit the clutch to be engaged, and means for preventing said gear train from being actuated at the same time by said first motor and said second motor, the arrangement being made to ensure engagement of the clutch for transmitting the power to said turret head and mounting of a tool on the main spindle of said turret head.

6. A complex machine tool as defined in claim 3, wherein said tool clamping and unclamping means comprises a hydraulic cylinder mounted within said ram means and having a piston rod, a crank shaft having an eccentric shaft portion connected to said piston rod, first and second rods operatively connected to the eccentric shaft portion of said crank shaft, respectively, said first rod being adapted to unclamp the tool when projecting towards the upper end of the main spindle of said turret head so as to urge against the upper end and clamp the tool when the rod is returned so as to disengage it from the main spindle of the turret head, said second rod extending on the upper part of the tool post for turning tool, and a first sleeve connected to said second rod, the arrangement being made such that when said second rod is moved downwards the tool mounted on said tool post is unclamped, whilst the second rod is moved upwards the tool is clamped.

7. A complex machine tool as defined in claim 6, further comprising a second sleeve kept in contact with the outer periphery of said first sleeve, wherein a plurality of balls accommodated within said first sleeve are arranged to drop from said first sleeve and engage with the inner peripheral surface of said second sleeve thereby clamping a tool.

8. A complex machine tool as defined in claim 2, wherein said turret head turning and indexing means comprises clutch means provided between the front face of said ram means and the face of said turret head on the side of the ram, an indexing shaft fixedly secured to said turret head and adapted to be inserted rotatably and slidably in the horizontal direction into said ram means, an indexing lever attached to said indexing shaft, a rod mounted within said ram means so as to be moved vertically in a plane extending at right angles to said indexing shaft, an engaging member mounted in an end face of said rod and adapted to engage with said indexing lever, and a hydraulic cylinder connected to said rod so as to move it vertically, the arrangement being made such that said turret head can be unclamped, indexed and clamped during one stroke of vertical movement of said rod.

9. A complex machine tool as defined in claim 8, further comprising a bearing for the indexing shaft mounted thereon, said bearing having a projecting part, said rod having a cam groove with which said projecting part is engaged.

10. A complex machine tool as defined in claim 9, further comprising another rod connected to said hydraulic cylinder, said another rod having a cam groove, the cam grooves of said rod and said another rod being formed oppositely, said projecting part formed in the bearing for said indexing shaft and another projecting part being arranged to engage with each other.

* * * * *